United States Patent [19]

Kurokawa

[11] Patent Number: 5,032,860
[45] Date of Patent: Jul. 16, 1991

[54] FULL CLOSED TYPE DIAPHRAGM APPARATUS

[75] Inventor: Hiroyuki Kurokawa, Tokyo, Japan
[73] Assignee: Nikon Corporation, Tokyo, Japan
[21] Appl. No.: 471,595
[22] Filed: Jan. 29, 1990

[30] Foreign Application Priority Data

Jan. 31, 1989 [JP] Japan .................................. 1-20993

[51] Int. Cl.⁵ .............................................. G03B 9/02
[52] U.S. Cl. .................................................. 354/274
[58] Field of Search ........................ 354/274, 272, 270

[56] References Cited

FOREIGN PATENT DOCUMENTS 59-165036  9/1983  Japan .................................. 354/274

*Primary Examiner*—Brian W. Brown
*Assistant Examiner*—Howard B. Blankenship
*Attorney, Agent, or Firm*—Shapiro and Shapiro

[57] ABSTRACT

A full closed type diaphragm apparatus having a complete light shut-off function comprises seven blade members made of thin plate and having respective pivot points rotatably supported in succession in a rotational direction about an optical axis and respective free end portions oriented in the rotational direction, and a rotating apparatus to simultaneously rotate the blade members by the same angle in the rotational direction about their respective pivot points. The blade members include at least one long blade member and a plurality of short blade members. As viewed along the optical axis, the arrangement is such that (i) the free end portion of the long blade member always overlaps the blade member supported third in succession therefrom, (ii) the free end portion of each short blade member always overlaps the blade member supported second in succession therefrom, and (iii) in at least a full closed state, there is interposed between each short blade member and the blade member supported third in succession therefrom the free end portion of one of the blade members supported first and second in succession from the short blade member, and between the long blade member and the blade member supported fourth in succession therefrom the free end portion of at least one of the blade members supported second and third in succession from the long blade member.

11 Claims, 4 Drawing Sheets

FULL CLOSED TYPE DIAPHRAGM APPARATUS

BACKGROUND OF THE INVENTION

1. Field of the Invention

The present invention relates to a diaphragm apparatus for controlling a light amount in an optical apparatus such as a camera or the like and, more particularly, to a full closed type diaphragm apparatus which can completely close an aperture.

2. Related Background Art

The shape of diaphragm aperture in a photographing lens of a camera exerts an influence on the integrated evaluation of delineating characteristics of the lens. That is, a feature of an out-of-focus state at the background of a main object to be photographed slightly differs for every aperture shape of the diaphragm. In a ghost phenomenon in which the image of the diaphragm is projected onto a film, the aperture shape itself is photographed. Thus, a shape near a true circle is generally preferable as the shape of an aperture by the diaphragm. Therefore, it is desirable that the number of blades is large. It is also preferable that the aperture shape is unchangeable for a change in diaphragm aperture.

In the region near the lens mirror barrel in which the diaphragm is assembled, generally, there is no abundance of space for the structure. Therefore, a large number of blades makes design and manufacture difficult. As the number of blades increases, when the diaphragm blades are collected toward the center of the opening portion to reduce the aperture, the edge surfaces of the diaphragm blades collide and cause friction. There easily occurs a phenomenon such that the further movement of the diaphragm blades toward the center of the opening portion cannot be performed and it becomes impossible to reduce the diaphragm to a further smaller value. Such a phenomenon can be relatively easily solved in the case of a diaphragm apparatus which does not execute the full closing operation. However, in a full closed type iris diaphragm apparatus which needs the full closing operation and is assembled in, for instance, a lens for a television camera, such a phenomenon easily occurs when the diaphragm is fully closed. Further, as the number of diaphragm blades increases, the difficulties in designing and manufacturing are increased and it is difficult to avoid the phenomenon.

Hitherto, an apparatus comprising six diaphragm blades has been known as a full closed type diaphragm apparatus whose aperture shape is unchanged even if the diaphragm value changes. An apparatus comprising seven blades is more preferable than the diaphragm apparatus comprising six blades because the aperture shape is closer to the true circle. However, in the case of the conventional full closed type diaphragm apparatus using seven diaphragm blades, the apparatus has one to three blades only for use in the closing operation and in the case of further reducing the diaphragm from a certain diaphragm value, for instance, from the minimum diaphragm value, such closing blades are rotated to close in accordance with the diaphragm reducing operation. When the closing blades start operating, the regular heptagonal aperture shape is destroyed and the resultant aperture shape differs from the inherent shape. To construct the diaphragm so that the aperture shape does not change until the full closed state, it is necessary to eliminate the phenomenon whereby the diaphragm blades collide and cause friction due to the diaphragm reducing operation and whereby the diaphragm cannot be further reduced before it is completely closed. However, the use of seven blades makes it very difficult to design and manufacture such a construction.

SUMMARY OF THE INVENTION

The present invention is made in consideration of the above problems. More particularly it is an object of the invention to provide a full closed type diaphragm apparatus in which an aperture shape is set to a regular heptagon by use of seven diaphragm blades in order to make the aperture shape closer to a true circle in which the diaphragm blades always smoothly slide and execute the stable aperture changing operations in a manner such that the aperture shape is unchanged until the full closed state (that is, the regular heptagon is held until the full closed state) and which avoids the phenomenon whereby the diaphragm blades collide and cause friction due to the diaphragm reducing operation and the diaphragm cannot be further reduced before the diaphragm is completely closed.

In a diaphragm apparatus having seven diaphragm blades, to assure that the aperture shape is unchanged until the full closed state, there is needed a construction to smoothly move the seven diaphragm blades so as to be mutually overlapped. One problem in achieving smooth operation is that the edge of a free end portion of a certain one of the seven diaphragm blades easily comes into contact with the inner edge portion of the third blade in succession therefrom along the free end portion, as due to warpage or the like of the blades. By such contact, smooth movement of the diaphragm blades is obstructed.

To prevent such a defective operation, it is sufficient to always interpose another blade between such a blade and the third blade. By interposing another blade, the mutual contacting state can be prevented even if the overlapped diaphragm blades are warped.

However, it is impossible to realize a construction to obtain an assembly such that another blade is always interposed between the above blade and the third blade with respect to all of the diaphragm blades. At least one combination which does not satisfy the above conditions always exists.

In accordance with the invention, this problem is solved through the use of a plurality of short blades and at least one long blade having respective pivot axes rotatably supported in succession in a rotational direction about an optical axis and respective free end portions oriented in said rotational direction. Means are also provided for rotating the blades by the same amount in said rotational directions about their respective pivot points to adjust the diaphragm value.

As viewed along the optical axis, the arrangement is preferably such that (i) the free end portion of the long blade always overlaps with the blades supported first through third in succession therefrom, (ii) the free end portion of each short blade always overlaps with the blades supported first and second in succession therefrom, and (iii) at least in the full closed state, there is interposed between each short blade member and the blade member supported third in succession therefrom the free end portion of one of the blade members supported first and second in succession from the short blade member, and between the long blade member and the blade member supported fourth in succession therefrom the free end portion of at least one of the blade members supported second and third in succession from the long blade member.

With the above construction, it is possible to realize a diaphragm apparatus comprising seven blades, in which the aperture shape (regular heptagon) does not change in dependence on the diaphragm value, collision of the diaphragm blades due to the diaphragm reducing operation does not occur, and the diaphragm can be completely closed by smoothly changing the diaphragm aperture.

BRIEF DESCRIPTION OF THE DRAWINGS

FIG. 4A shows a full open state;

FIG. 4B shows a full closed state;

DESCRIPTION OF THE PREFERRED EMBODIMENTS

Figure 5:
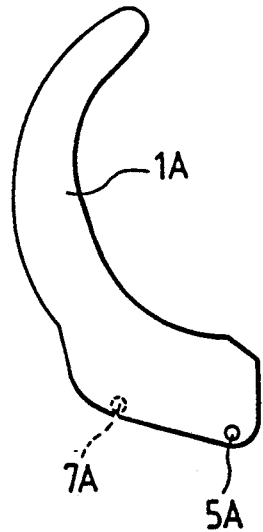
FIG. 5 is a diagram showing a shape of a long blade.
Figure 6:
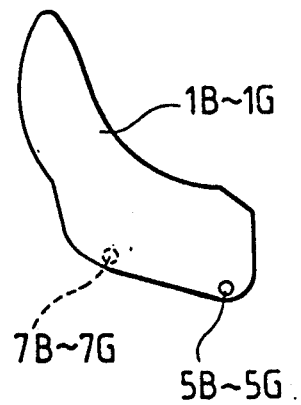
FIG. 6 is a diagram showing a shape of a short blade.

In the illustrate embodiments, seven diaphragm blades forming a diaphragm aperture comprise one long blade shown in FIG. 5 and six short blades configured as shown in FIG. 6.

A construction of a first embodiment will now be described with reference to FIGS. 1 to 4A and 4B. A construction of another embodiment will be described with reference to FIGS. 7 and 8.

Figure 1:
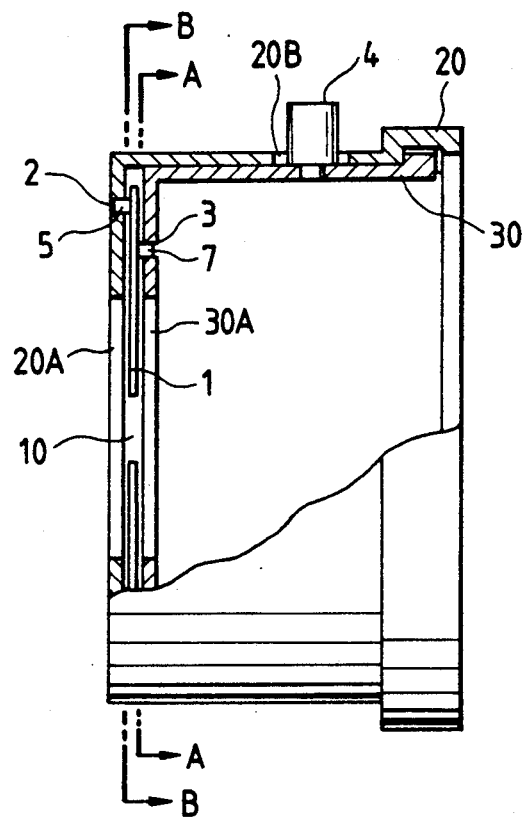
FIG. 1 is a partial cross sectional view of an embodiment of the invention.
Figure 2:
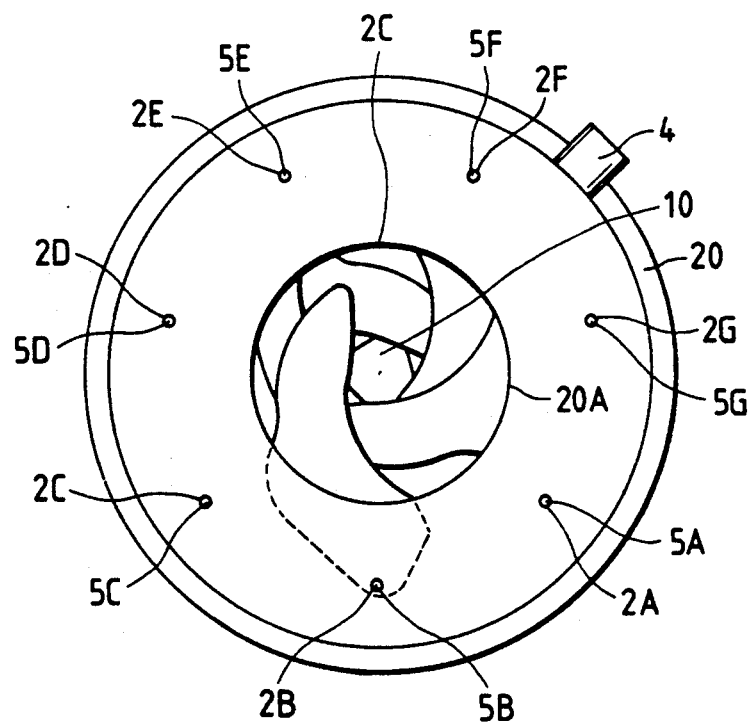
FIG. 2 is a left side elevational view showing the embodiment of FIG. 1 at an intermediate diaphragm value.
Figure 4A:
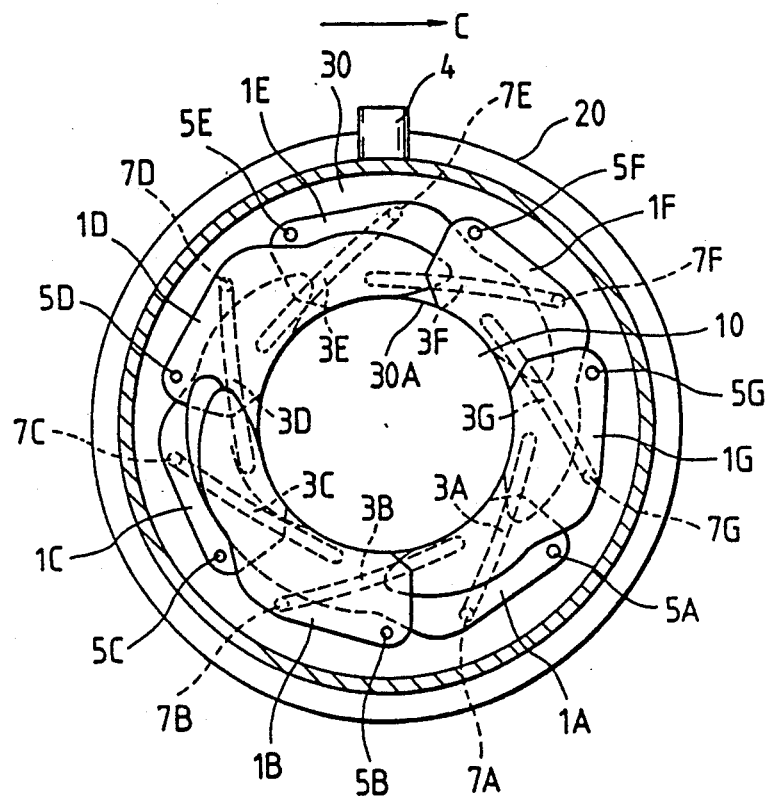
FIGS. 4A and 4B are cross sectional views taken along the line B—B in FIG. 1.
Figure 4B:
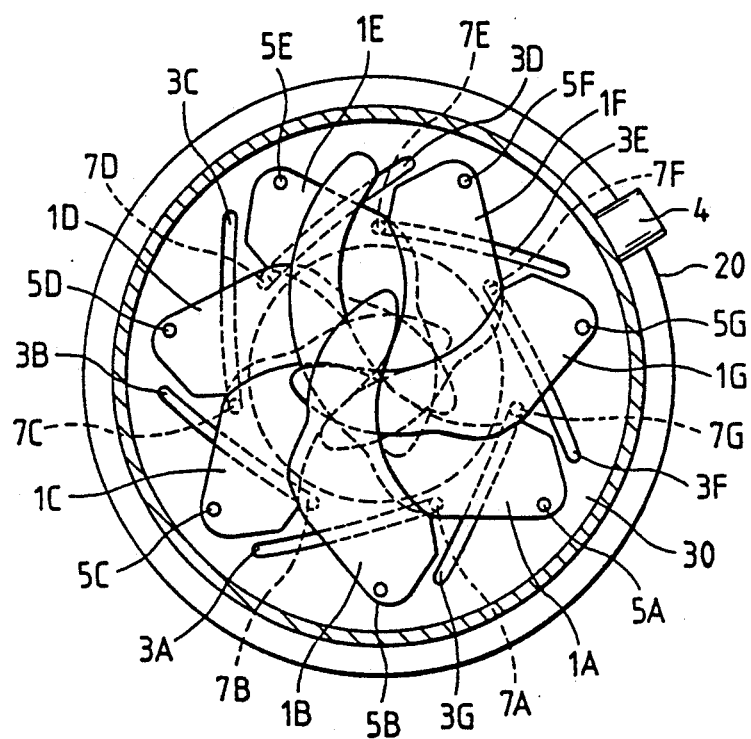

As shown in FIGS. 4A and 4B, seven diaphragm blades 1 (1A to 1G) are rotatably supported between a fixed ring 20 and a diaphragm operating ring 30 by the engagement of seven fulcrum pins 5 (5A to 5G) and seven fulcrum holes 2 (2A to 2G). Referring to FIG. 1, the diaphragm operating ring 30 can be rotated by an operating rod 4 by only a predetermined angle in the fixed ring 20. The operating rod 4 is attached on the diaphragm operating ring 30 by penetrating a circumferential groove 20B formed in the fixed ring 20. An opening portion 20A is formed in the central portion of the fixed ring 20. The seven fulcrum holes 2 (2A to 2G) are formed at regular intervals at positions which are away from the center of the opening portion 20A by a predetermined distance.

As shown in FIGS. 5 and 6, the fulcrum pins 5 (5A to 5G) are attached on one surface of each of the long blade 1A and short blades 1B to 1G, respectively. Guide pins 7 (7A to 7G) are attached on the other surfaces. The fulcrum pins 5A to 5G are rotatably inserted into the fulcrum holes 2A to 2G, respectively.

Figure 3:
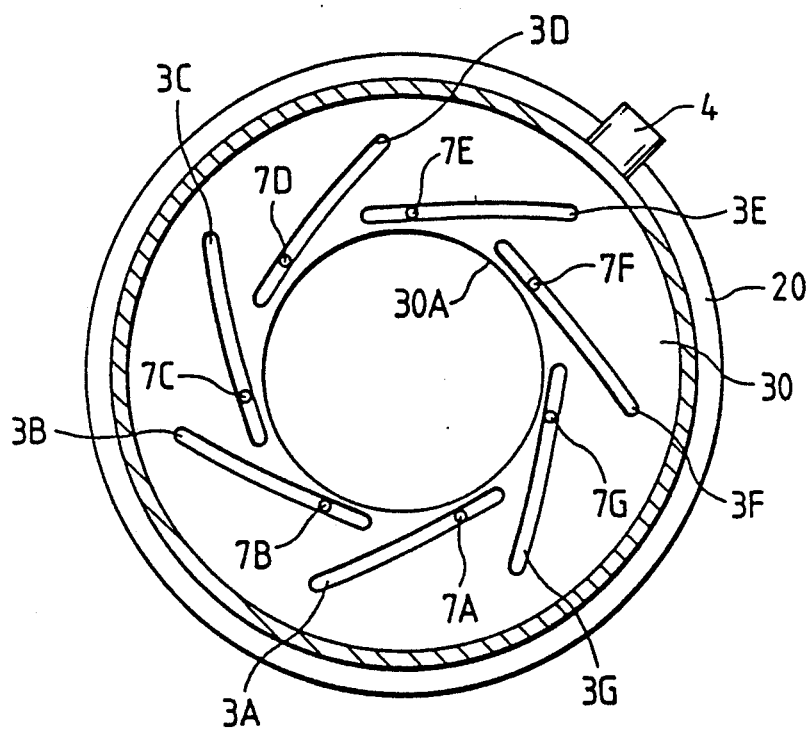
FIG. 3 is a cross sectional view taken along the line A—A in FIG. 1.

As shown in FIG. 3, an opening portion 30A and seven spiral guide grooves 3A to 3G are formed in the central portion of the diaphragm operating ring 30. All of the seven guide grooves 3A to 3G have the same shape and their positional relations from the center of the opening portion 30A are all set into the same condition. The guide pins 7A to 7G are inserted into the guide grooves 3A to 3G, respectively. Therefore, when the operating ring 30 rotates by rotating the operating rod 4 along the circumferential groove 20B, all of the diaphragm blades 1A to 1G rotate in a similar manner.

Thus, in moving from the full open state to the full closed state through intermediate diaphragm values, a diaphragm aperture 10 changes only its size while keeping a regular heptagon shape.

The diaphragm apparatus of the invention further needs the following two structural conditions.

(1) Overlap conditions of the free end portions of the diaphragm blades

Figure 7:
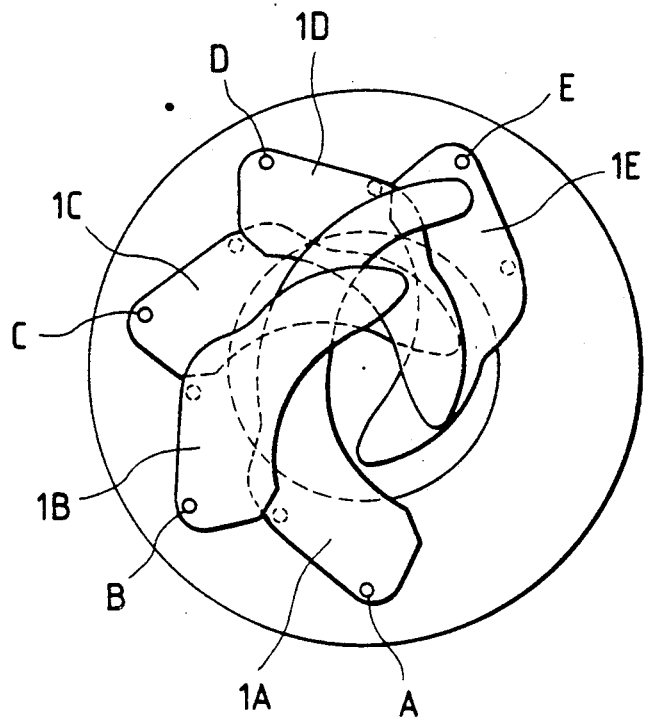
FIG. 7 is a diagram showing a state upon assembly of the long blade in another embodiment.

All of the diaphragm blades are assembled so that their free end portions are directed in the same rotational direction about the optical axis. As shown in FIGS. 4A, 4B, and 7, the long blade 1A is constructed in a manner such that the free end portion thereof always overlaps with the first to third blades in succession therefrom as counted in the direction of the free end portion of the long blade 1A (namely, the blades overlap when they are viewed in the optical axis direction) irrespective of the rotating state. In the full open state, as shown in FIG. 4A, the free end portion of the long blade 1A overlaps the first to third blades 1B, 1C, and 1D; while in the full closed state, as shown in FIG. 4B, it overlaps the first to fourth blades 1B, 1C, 1D, and 1E. The short blades 1B to 1G are constructed so that the free end portion of each blade always overlaps the first and second blades when in sucession therefrom as counted in the direction of the free end portion of the short blade. In the full open state, as shown in FIG. 4A, the free end portion of the short blade overlaps the first and second blades, (for instance, in the case of the short blade 1B, its free end portion overlaps the short blades 1C and 1D); while in the full closed state, as shown in FIG. 4B, the free end portion overlaps the first to third blades, (for instance, in the case of the short blade 1B, it overlaps the diaphragm blades 1C, 1D, and 1E).

(2) Arranging conditions in the optical axis direction of the diaphragm blades

Figure 8:
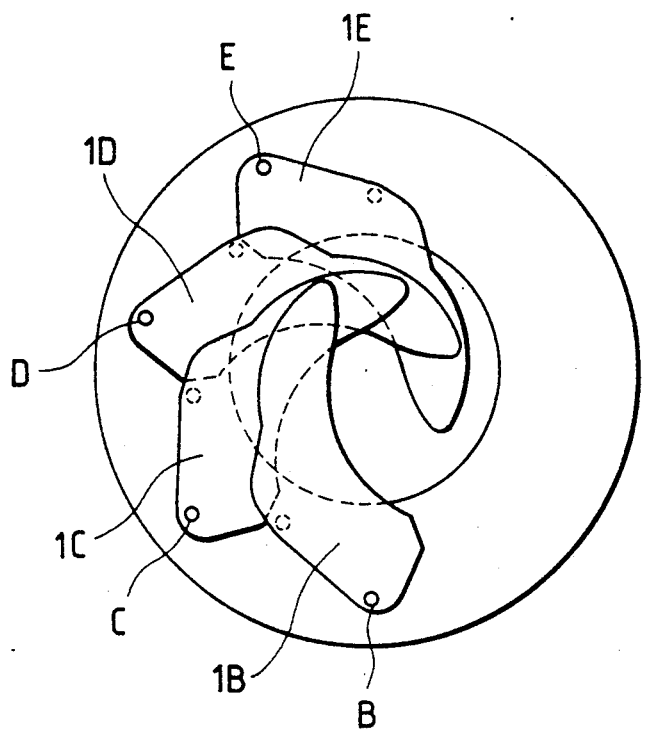
FIG. 8 is a diagram showing a state upon assembly of the short blades.

As shown in FIGS. 8 and 4B, short blades (1B-1G) are arranged in the optical axis direction so that for each short blade the free end portion of at least one of the first and second blades therefrom, as counted in the direction of the free end portion of the short blade, is sandwiched between the short blade and the third blade therefrom. For example, in the case of blade (1B) and the first to third blades (1C-1E) therefrom, the first blade (1D) is sandwiched between blades (1B and 1E) in FIG. 4, whereas the first and second blades (1C and 1D) are sandwiched between blades (1B and 1E) in FIG. 8.

As shown in FIGS. 7 and 4B, the long blade (1A) and short blades are arranged in the optical axis direction so that the free end portion of at least one of the two blades (1C and 1D) which are not adjacent to the long blade (1A) among the three blades (1B, 1C, and 1D) between the long blade (1A) and the fourth blade (1E) as counted in the direction of the free end portion of the long blade (1A) (in the embodiment of FIG. 4, the free end portion of the first blade 1D; in the case of the embodiment of FIG. 7, the free end portions of the two blades 1C and 1D) is sandwiched between the long blade (1A) and the fourth blade (1E) therefrom.

Although the arranging conditions in the optical axis direction of the diaphragm blades need to be satisfied in at least the full closed state, it is not always necessary to satisfy those conditions in the full open state.

The seven diaphragm blades are moved and controlled in accordance with a diaphragm value along the seven guide grooves 3A to 3G of the same condition. Therefore, all of the diaphragm blades are rotated by the same rotational amount and the aperture shape is unchanged irrespective of the diaphragm value.

Explanation will now be made hereinbelow with respect to the order in which the seven diaphragm blades are attached to the fixed ring 2 and which is suitable to realize a diaphragm apparatus which can satisfy the arranging conditions in the optical axis direction of the diaphragm blades as mentioned above.

In FIGS. 4A and 4B, assuming that the fulcrum hole 2A to attach the long blade is set to A and the fulcrum holes 2B to 2G are set to B, C, D, E, F, and G in the clockwise direction from the fulcrum hole A, respectively, it is necessary to attach the blades in accordance with the following eighteen kinds of orders in order to obtain the construction in the above embodiment. In the cases the orders other than the following orders, the above arranging conditions cannot be satisfied and before the diaphragm blades are completely closed, it becomes impossible to further reduce the diaphragm due to the collision of the diaphragm blades.

That is, there are the following eighteen kinds of orders.

|  |  |
|---|---|
| B C A D F E G | (1) |
| B C A D F G E | (2) |
| C E D F A G B | (3) |
| C E D F A B G | (4) |
| E G F D A B C | (5) |
| G B A F D C E | (6) |
| C B D E G F A | (7) |
| C B A D F E G | (8) |
| E C D F A G B | (9) |

Opposite to the above orders

|  |  |
|---|---|
| G E F D A C B | (1) |
| E G F D A C B | (2) |
| B G A F D E C | (3) |
| G B A F D E C | (4) |
| C B A D F G E | (5) |
| E C D F A B G | (6) |
| A F G E D B C | (7) |
| G E F D A B C | (8) |
| B G A F D C E | (9) |

In the diaphragm apparatus of the invention, since the aperture shape has been set to a regular heptagon by using seven diaphragm blades, it is closer to a true circle and the aperture shape is unchanged until the full closed state irrespective of the diaphragm value (that is, even if a diaphragm aperture changes, the aperture shape is held to the regular heptagon). Therefore, a good ghost is always obtained at any disphragm value without changing the delineating characteristics on the background in the out-of-focus state due to the diaphragm value. Moreover, according to the diaphragm apparatus of the invention, the diaphragm blades are always smoothly slided and stable diaphragm opening/closing operations are obtained. The aforementioned phenomenon such that the diaphragm blades themselves collide and cause friction due to the diaphragm reducing operation and whereby it becomes difficult to further reduce the diaphragm before the diaphragm is completely closed does not occur.

What is claimed is:

1. A full closed type diaphragm apparatus having a complete light shut-off function, comprising:
   (a) seven thin-plate blade members including at least one long blade member and a plurality of short blade members, with each blade member having a free end portion and a base end portion provided with a pivot point,
   (b) means rotatably supporting the respective pivot points of said blade members in succession in a rotational direction about an optical axis, with said free end portions of said blade members being oriented in said rotational direction, and
   (c) means for simultaneously rotating said blade members by a same angle in said rotational direction about their respective pivot points, and
   (d) wherein as viewed along said optical axis said blade members are arranged such that
      (i) the free end portion of said long blade member always overlaps with the blade member supported third in succession therefrom,
      (ii) the free end portion of each short blade member always overlaps with the blade member supported second in succession therefrom, and
      (iii) at least in a full closed state, there is interposed between each short blade member and the blade member supported third in succession therefrom the free end portion of one of the blade members supported first and second in succession from that short blade member, and between said long blade member and the blade member supported fourth in succession therefrom the free end portion of at least one of the blade members supported second and third in succession from said long blade member.

2. An apparatus according to claim 1, wherein said blade members comprise one long blade member A and six short blade members B, C, D, E, F, and G and are arranged around the optical axis in accordance with the following order:

A—B—C—D—E—F—G.

3. An apparatus according to claim 2, wherein said blade members are arranged along the optical axis in accordance with the following order:

B—C—A—D—F—E—G.

4. An apparatus according to claim 2, wherein said blade members are arranged along in the optical axis in accordance with the following order:

B—C—A—D—F—G—E.

5. An apparatus according to claim 2, wherein said blade members are arranged along in the optical axis in accordance with the following order:

C—E—D—F—A—G—B.

6. An apparatus according to claim 2, wherein said blade members are arranged along in the optical axis in accordance with the following order:

C—E—D—F—A—B—G.

7. An apparatus according to claim 2, wherein said blade members are arranged along in the optical axis in accordance with the following order:

E—G—F—D—A—B—C.

8. An apparatus according to claim 2, wherein said blade members are arranged along in the optical axis in accordance with the following order:

G—B—A—F—D—C—E.

9. An apparatus according to claim 2, wherein said blade members are arranged along in the optical axis in accordance with the following order:

C—B—D—E—G—F—A.

10. An apparatus according to claim 2, wherein said blade members are arranged along in the optical axis in accordance with the following order:

C—B—A—D—F—E—G.

11. An apparatus according to claim 2, wherein said blade members are arranged along in the optical axis in accordance with the following order:

E—C—D—F—A—G—B.

* * * * *